March 4, 1969  E. C. TUDOR ET AL  3,431,389
METHOD FOR WORKING MATERIALS BY MEANS OF AN ENERGY BEAM
Filed Oct. 15, 1965
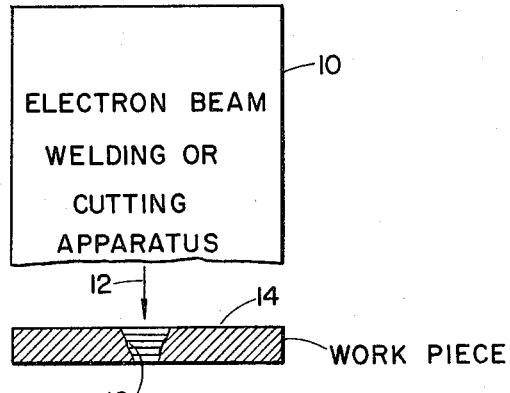
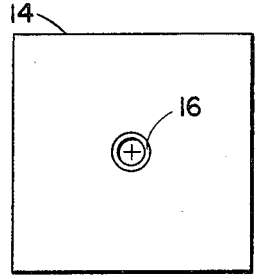
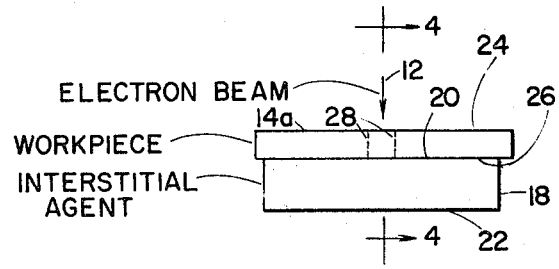
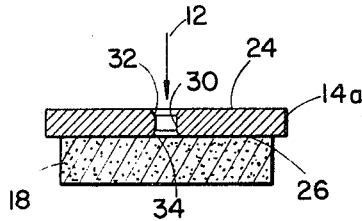
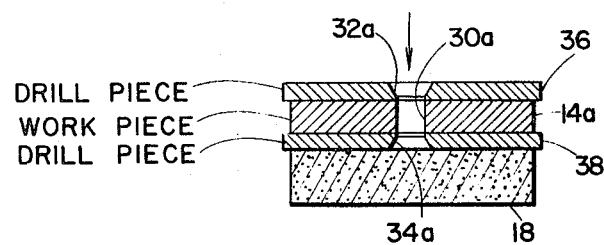
INVENTORS
EDWARD C. TUDOR
JAMES A. GOFF
BY *Hood, Gust & Irish*
ATTORNEYS

United States Patent Office 3,431,389
Patented Mar. 4, 1969

3,431,389
METHOD FOR WORKING MATERIALS BY
MEANS OF AN ENERGY BEAM
Edward C. Tudor and James A. Goff, Indianapolis, Ind.,
assignors to Tudor Corporation, Indianapolis, Ind.
Filed Oct. 15, 1965, Ser. No. 496,461
U.S. Cl. 219—121                            10 Claims
Int. Cl. B23k 9/00, 9/16

ABSTRACT OF THE DISCLOSURE

A method is disclosed for drilling holes of uniform diameter through work pieces by means of electron beams and the like. The steps include directing an energy beam onto a discrete area of material to be drilled, the beam of material-melting intensity. A body of material serving as an interstitial agent is disposed contiguously with respect to the material to be drilled in registry with the beam. The beam melts the material in the work piece, this melted material transferring to the interstitial agent by reason of capillary action.

---

This invention relates to a method for working materials by means of an energy beam and more particularly to a method for drilling holes and performing cutting operations in various material by means of a beam of electrons. For the purpose of removing material or for drilling holes in materials, conventional electron beam-machining methods depend upon material vaporization. The area of the material which is worked upon is greatly heated by the bombardment in the electrons such that the material is vaporized at the bombarded area. The cut or hole is slowly formed by vaporizing a small amount of material by the electron beam. Since the rate of material removal is relatively slow, the beam is usually pulsed many times and possibly refocused several times. The result is usually a tapered cut or bore having irregular, non-square sides through the depth of the cut or hole as will be explained in more detail hereinafter.

Conventionally, for the drilling of holes, electron beam cutters are used in preference to the so-called welding machines. The former are more expensive than the welding machines, which are slower and more difficult to use in the drilling of holes and the performing of cutting operations.

The present invention is unique for several reasons. One involves the use of conventional electron beam welding machines for drilling holes instead of electron beam cutters. A second reason involves the drilling of a hole with straight sides instead of irregular, non-uniform sides which results from the use of conventional methods. Still a third and most important reason resides in being able to drill holes more quickly than has heretofore been possible.

It is an object of this invention to provide a method for using a beam of charged particles for forming holes, slots or any other irregular shaped cuts with regular and even sides.

It is another object of this invention to provide a method for drilling holes by the use of a beam of charged particles in a minimum of time.

It is still another object of this invention to provide a method for forming holes or the like in a workpiece through the use of interstitial agents.

It is yet another object of this invention to provide a method for drilling holes in a workpiece by means of a beam of charged particles wherein flares or countersinks at the entrance and exit sides of the holes may be avoided.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a diagrammatic illustration of a conventional beam welding or cutting apparatus being used for the purpose of drilling a hole in a metallic workpiece;

FIG. 2 is a top plan view of the workpiece of FIG. 1;

FIG. 3 is an edge view of a workpiece and an interstitial agent in position preparatory to a drilling operation;

FIG. 4 is a cross-sectional view of the arrangement of FIG. 3 showing the shape of a hole after the drilling operation is performed; and FIG. 5 is a cross-sectional view illustrating another embodiment of this invention wherein a workpiece is sandwiched between two auxiliary drill pieces and these in turn are superposed on a body of interstitial agent.

Referring to the drawings, and more particularly to FIG. 1, a conventional electron beam welding or cutting apparatus 10 is shown as emitting a focused beam 12 of electrons used for the purpose of drilling an aperture in a metallic workpiece 14. This workpiece 14 may, in the embodiment to be described hereinafter, take the form of a square piece of stainless steel which is approximately ⅛ inch thick. Using conventional techniques, the apparatus 10 and beam 12 will drill or pierce a hole in the piece 14 having the shape as indicated by the numeral 16. As will be noted in the drawing, the sides of this hole 16 are not straight and normal to the upper and lower, parallel surfaces of the workpiece 14, but instead are irregularly tapered with the upper end of the opening being of larger diameter than the lower end.

In practicing the present invention, the workpiece 14a, as shown in FIG. 3, which may be of the same material and size as the piece 14 of FIG. 1, is positioned on a body 18 of interstitial agent or material. This body 18, as shown, is of substantially the same width and length as the workpiece 14a and is in the form of a rectangular block. As shown, the upper and lower surfaces 20 and 22 of the body 18 are flat and parallel as are the surfaces 24 and 26, respectively, of the workpiece 14a. The workpiece 14a is superposed on the body 18 such that the two surfaces 20 and 26 are in intimate, contiguous engagement over an extended area. As shown in FIG. 3, this area is in registry with the portion 28 to be drilled out of the workpiece 14a. While the block 18 is shown as being slightly smaller than the workpiece, it may be of the same size and shape.

With the workpiece 14a so mounted and positioned on the body 18, the electron beam 12 is focused onto the surface 24 at the spot where the hole is to be drilled into the piece 14a. This spot is indicated by the numeral 28. The beam 12 is adjusted to an intensity at which the material of the piece 14a is melted or otherwise removed. Stated differently, the beam 12 may be of conventional size and configuration, e.g., circular in cross-section, and is of sufficient intensity to pierce the workpiece 14a. Preferably, the axis of the beam 12 is set at right angles to the plane of the surface 24. For an ⅛ inch thickness in the piece 14a, the beam 12 preferably is focused on the surface 24. By holding the beam on the piece 14a in the position shown in FIG. 3, a hole is drilled or pierced through the thickness as indicated by the numeral 30 in FIG. 4. As is clearly shown in the drawing, the midportion of this hole 30 is of substantially uniform diameter, while the opposite ends thereof are bell-mouthed or countersunk, as indicated by the numerals 32 and 34.

This is characteristic of one embodiment of this invention.

Bell-mouthing is not as pronounced, and in some instances is non-existent, for materials of about 0.020″ thickness. The presence and degree of bell-mouthing is dependent to some extent on the type of material being drilled, the kind of interstitial agent, the size and shape of the interstices and the like.

The material of the body 18, which is characterized herein as an "interstitial" material or agent, may take any of a variety of different forms and materials. Generally speaking, conventional steel wool, glass fiber cloth, molybdenum metal powder of minus 100-mesh size, pressed metal meshes (screen) and the like will serve quite adequately for the material of the body 18. Molybdenum powder of minus 325-mesh size has been found to perform satifactorily. This powder in the form of the body 18 is piled to a thickness of, for example, ⅛ or ¼ of an inch, and if it is desired, it may be contained within a cup of suitable refractory material such as ceramic or metal. The upper surface of the body 18, or in other words the upper surface of the powder, engages or contacts the under surface 26 of the workpiece 14a, especially in the area of the hole 30. Some slight spacing therebetween may be provided for improving the capillary action.

Steel wool which has been used is of the conventional type purchased in the usual retail stores and has a fiber size corresponding to that of human hair. This wool is compacted preferably to the point at which the interstices between the steel fibers are smaller than the diameter of the opening 30. The compacted thickness as indicated by the thickness of the body 18 may be ½ to one (1) inch.

Glass fiber cloth woven of conventional roving should have spaces or interstices between fibers of a size preferably smaller than the diameter of the opening 30, or in other words smaller than the diameter of the hole to be drilled, and should be of a thickness provided by placing one layer of cloth on another until the body formed thereby is ¼ to ½ inch thick.

While the foregoing materials have been mentioned as being suitable as the interstitial agents, as will appear obvious from the description that follows, other materials, both metallic and non-metallic, may be used without departing from the spirit and scope of this invention.

It has been found that by positioning the workpiece 14a on a body 18 of the aforementioned interstitial agent, the hole 30 that is pierced or drilled has sides which are substantially straight and uniform. A better understanding of the straightness of these sides may be obtained by comparing the configuration of the midportion of the hole 30 (FIG. 4) with the shape of the hole 16 in the workpiece 14 of FIG. 1. The sides of the hole 16 not only taper, but they are irregular from top to bottom. The hole 30, on the other hand, other than the countersink portions 32 and 34, is substantially straight and without the pronounced irregularities and tapering shape.

In the drilling or formation of the hole 30, it is theorized that the vaporization of the metal of the workpiece 14a is not utilized as much as is the principle of capillary action of the interstitial agent forming the body 18. As the beam 12 impinges the workpiece 14, it is theorized that a small area thereof melts and the molten material is drawn therefrom by the capillary action of the interstitial agent. Support for this theory that such capillary action does occur is the fact that experiments have shown that as the interstices in the body 18 become larger, the smaller holes 28, 30 become more difficult to accomplish. Experiments have proven thus far that it is desirable for the interstices to be smaller than the size of the hole to be drilled. From this, it is theorized that as the material melts in the area impinged by the electron beam, it is drawn into the interstitial material of the body 18 by capillary action. The result is a hole of more uniform straightness and dimension than has heretofore been accomplished.

The body 18 may also be used on the top side 24 of the workpiece 14a in performing the same drilling operation. In this event, the beam 12 first pierces the interstitial agent before piercing the workpiece 14a. The same, improved drilling result is achieved in this way.

Also, two bodies 18 may be used with the workpiece 14a sandwiched therebetween. In such event, the surfaces of the two bodies must be contiguous with the top and bottom surfaces of the workpiece 14a.

As previously explained in connection with FIG. 4, slight countersinks 32 and 34 may be formed in the drilling of the hole 30. If it is desired that the diameter of this hole 30 be uniform throughout the thickness of the workpiece 14a, this is easily accomplished by sandwiching the piece 14a between two plates of stainless steel of, for example, 1/16 inch in thickness. These two plates are indiacted by the numerals 36 and 38 in FIG. 5 and may be of the same square shape as the workpiece 14a (FIG. 5). Thus, in the drilling of the hole by means of electron beam 12, the countersinks 32a and 34a, corresponding to the countersinks 32 and 34, respectively, of FIG. 4, are formed only in the drill pieces 36 and 38, respectively. The finished hole 30a is, therefore, of uniform diameter throughout the ⅛ inch thickness of the workpiece 14a.

In order to obtain this uniformity in diameter of the hole 30a, it is, of course, necessary that the thickness of the drill pieces 36 and 38 be at least as great as and preferably slightly greater than the depth of the countersinks 32a and 34a. The interstitial body 18 is used as previously described.

A typical example of electron beam machining by the conventional method which uses material vaporization compared to that of the method of this invention which uses the interstitial bodies (or as theorized the capillary action) is given in the following chart for machining a 0.005 inch diameter hole in a 0.020 inch thick stainless steel:

| Conventional method | Method of this invention |
| --- | --- |
| Pulse rate, 2,500 pulses per second | 1 pulse per 30 microseconds. |
| Pulse width, 30 microseconds | 30 microseconds. |
| Rate of material removal, 0.01 milligram per second. | 1.67 grams per second. |
| Time required, 5 seconds | 30 microseconds. |

It may be stated at this point that the conventional method utilized the well known pulsing techniques in drilling the hole. The shape of this hole had the same irregularity as explained hereinabove in connection with the hole 16 of FIG. 1. The method of this invention does not require pulsing but instead makes use of a continuous, non-pulsed beam which requires no refocusing once the drilling operation is started.

Typical parameters in cutting along a straight line through a piece of stainless steel material approximately ⅛ inch thick are as follows, using a conventional high voltage electron beam welding machine:

(A) Accelerating voltage -- 130 kilovolts.
(B) Beam current -------- 8 ma.
(C) Cutting speed -------- 6.7 inches per minute.
(D) Focus --------------- Onto surface.
(E) Interstitial agent ------- Steel wool, medium fine.

While this invention has been explained in connection with electron beams, the same principles are applicable in the use of other energy beams such as ion, light, laser and plasma beams.

While there have been described above the principles of this invention in connection with specific apparatus, it is to be clearly understood that this description is made only by way of example and not as a limitation to the scope of the invention.

What is claimed is:
1. The method of working a material with an energy beam comprising the steps of (a) directing an energy beam onto a discrete area of material to be worked, said beam being of material-melting intensity, and (b) positioning an interstitial agent contiguous to said material in registry with said beam, whereby material removed by said beam is at least in part transferred to said agent.

2. The method of working a material with an energy beam comprising the steps of (a) focusing an energy beam onto a discrete area of one surface of a metallic workpiece, said beam being of a metal-melting intensity, and (b) positioning an interstitial agent contiguous to said surface in registry with said beam, whereby the sides of a hole bored in said workpiece extend substantially straight and parallel to the axis of said beam.

3. The method of working a material with an energy beam comprising the steps of (a) focusing an energy beam onto a discrete area of one surface of a metallic workpiece, said beam being of metal-melting intensity, and (b) positioning an interstitial agent contiguous to opposite surfaces of said workpiece in registry with said beam, whereby the sides of a hole bored in said workpiece extend substantially straight and parallel to the axis of said beam.

4. The method of working a material with a beam of charged particles comprising the steps of positioning an auxiliary drill piece onto a member to be drilled, said member and said drill piece having extended area contiguous surface portions in registry with a discrete area of said member, and focusing a beam of charged particles onto said drill piece at a location in registry with said discrete area of said member, said beam being of material-melting intensity, whereby said beam will drill a hole through both said drill piece and said member, said drill piece having a thickness no less than the depth of a countersink formed therein by said beam.

5. The method of working a material with a beam of charged particles comprising the steps of positioning an auxiliary drill piece onto a member to be drilled, said member and said drill piece having extended area contiguous surface portions in registry with a discrete area of said member, positioning said member onto a body of interstitial agent with said discrete area overlying said agent, and focusing a beam of charged particles onto said drill piece at a location in registry with said discrete area of said member, said beam being of material-melting intensity, whereby said beam will drill a hole through both said drill piece and said member, said drill piece having a thickness no less than the depth of a countersink formed therein by said beam.

6. The method of drilling a hole in a member having two opposite surfaces comprising the steps of positioning said member between two metallic drill pieces with said opposite surfaces being in engagement with the latter, said two drill pieces having surfaces contiguous with extended area portions of said opposite surfaces, respectively, in registry with a discrete drill area of said member, positioning a body of interstitial agent into contiguous engagement with one of said drill pieces on the side thereof opposite said member and in registry with said drill area, and directing a material-melting beam of charged particles onto one of said drill pieces in registry with said drill area for piercing a hole through both said drill pieces and said member, each drill piece having a thickness no less than the depth of a countersink formed therein by said beam.

7. The method of working a material with a beam of charged particles comprising the steps of directing a beam of charged particles onto a discrete area of a member from which material is to be removed, said beam having an intensity which melts elemental portions of said member, and withdrawing the material melted by capillary action.

8. The method of claim 1 wherein said interstitial agent is molybdenum powder of minus 100 mesh size.

9. The method of claim 1 wherein said interstitial agent is steel wool compacted to a substantially solid mass wherein interstices of microminiature size are provided between the fibers of said wool.

10. The method of claim 1 wherein said interstitial agent is cloth of glass fiber wherein microminiature interstices are provided between the fibers thereof.

References Cited

UNITED STATES PATENTS

| | | | |
|---|---|---|---|
| 2,819,380 | 1/1958 | Eaton | 219—121 |
| 3,118,050 | 1/1964 | Hetherington | 219—121 |
| 3,134,013 | 5/1964 | Opitz et al. | 219—121 |
| 3,334,213 | 8/1967 | Sauve et al. | 219—121 |
| 3,340,377 | 9/1967 | Okazaki et al. | 219—121 |

OTHER REFERENCES

IBM Technical Disclosure Bulletin, vol. 8, No. 1, dated June 1965, by M. P. Manny et al.

IBM Technical Disclosure Bulletin, vol. 8, No. 3, dated August 1965, by H. F. Hudolin.

RICHARD M. WOOD, *Primary Examiner.*

W. D. BROOKS, *Assistant Examiner.*

U.S. Cl. X.R.

219—69